(12) United States Patent
Becicka et al.

(10) Patent No.: US 10,858,801 B2
(45) Date of Patent: Dec. 8, 2020

(54) SYSTEM FOR CONTROLLING OPERATION OF A MACHINE

(71) Applicant: Caterpillar Inc., Peoria, IL (US)

(72) Inventors: Troy Kenneth Becicka, Allison Park, PA (US); Mo Wei, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 449 days.

(21) Appl. No.: 15/826,905

(22) Filed: Nov. 30, 2017

(65) Prior Publication Data
US 2019/0161938 A1 May 30, 2019

(51) Int. Cl.
| | | |
|---|---|---|
| *E02F 3/84* | (2006.01) | |
| *G05D 1/00* | (2006.01) | |
| *G05D 1/02* | (2020.01) | |
| *E02F 3/76* | (2006.01) | |
| *E02F 9/20* | (2006.01) | |
| *G01S 19/53* | (2010.01) | |
| *G01S 19/49* | (2010.01) | |
| *G01S 19/47* | (2010.01) | |

(52) U.S. Cl.
CPC ............ *E02F 3/841* (2013.01); *E02F 3/7609* (2013.01); *E02F 3/844* (2013.01); *E02F 9/205* (2013.01); *G01S 19/49* (2013.01); *G01S 19/53* (2013.01); *G05D 1/0088* (2013.01); *G05D 1/021* (2013.01); *G01S 19/47* (2013.01); *G05D 2201/0202* (2013.01)

(58) Field of Classification Search
CPC ......... E02F 3/841; E02F 3/7609; E02F 3/844; E02F 9/205; G01S 19/49; G01S 19/53; G01S 19/47; G05D 1/0088; G05D 1/021; G05D 2201/0202

USPC .......................................................... 701/23
See application file for complete search history.

(56) References Cited

U.S. PATENT DOCUMENTS

| | | | |
|---|---|---|---|
| 6,062,317 A | | 5/2000 | Gharsalli et al. |
| 6,668,223 B2 * | | 12/2003 | Blackmore et al. ... A01D 45/00 701/50 |
| 9,250,086 B1 * | | 2/2016 | Friend et al. .......... G01C 21/20 |
| 9,481,977 B1 | | 11/2016 | Clar et al. |
| 9,506,224 B2 | | 11/2016 | Kontz |
| 10,225,984 B2 * | | 3/2019 | Slichter et al. ........ A01D 75/00 |
| 2005/0088643 A1 * | | 4/2005 | Anderson ................ G01C 3/08 356/5.01 |
| 2015/0253427 A1 * | | 9/2015 | Slichter et al. ......... G01S 17/08 |

(Continued)

*Primary Examiner* — Angelina Shudy
(74) *Attorney, Agent, or Firm* — Oblon, McClelland, Maier & Neustadt

(57) ABSTRACT

A system for controlling operation of a machine having a frame supported by ground engaging members and a work implement movably supported by the frame includes a machine position sensor and an implement position sensor to output data pertaining to a position and orientation of the machine and the work implement within a worksite. The system further includes a controller that receives the data output by the machine position sensor and the implement position sensor. The controller computes an amount of gap that is required for alignment of the machine and the work implement with a slot based on the received data. The controller then controls a movement of the ground engaging members for positioning the machine at the computed amount of gap from a cut point located within the slot prior to the work implement entering a cut position for performing a cut within the slot.

20 Claims, 4 Drawing Sheets

(56) References Cited

U.S. PATENT DOCUMENTS

| | | | |
|---|---|---|---|
| 2016/0076224 A1* | 3/2016 | Edara | E02F 9/2029 |
| | | | 701/50 |
| 2016/0153175 A1* | 6/2016 | Wei | E02F 9/2025 |
| | | | 701/50 |
| 2016/0201298 A1 | 7/2016 | Taylor et al. | |
| 2016/0282857 A1* | 9/2016 | DeVore | E02F 9/262 |
| 2017/0016870 A1* | 1/2017 | McPeek | G01N 33/025 |
| 2018/0132423 A1* | 5/2018 | Rowan | G06Q 50/02 |
| 2019/0289788 A1* | 9/2019 | Slichter et al. | A01D 75/00 |
| 2020/0090094 A1* | 3/2020 | Blank | G06Q 50/28 |

* cited by examiner

SYSTEM FOR CONTROLLING OPERATION OF A MACHINE

TECHNICAL FIELD

The present disclosure relates to an earthmoving machine, and more particularly, to a system for optimizing an amount of gap that could be required for alignment of an earthmoving machine with a slot in which the earthmoving machine is required to perform a cut.

BACKGROUND

Earthmoving machines, such as track-type tractors, are used to push and carry material over a distance as part of a material removal or shaping process. Generally, it is desired to move the earthmoving machine in a relatively straight line from a start position to a desired end position. However, unequal forces exerted on a work implement of the machine e.g., a blade of the track-type tractor may be caused by characteristics of the material being pushed, such as large rocks and different material types, e.g., clay, sand, and the like. These unequal forces tend to push the machine in directions other than the desired straight line, and cause the earthmoving machine to deviate from the desired direction of travel.

In addition, steering of such machines when operating under load is discouraged as slippage of one of the tracks of the earthmoving machine may cause the machine to deviate from the desired direction of travel. Yet, in U.S. Pat. No. 5,487,428, Yamamoto et al. disclose a system which tilts the blade of a bulldozer in a manner to control steering of the bulldozer in response to determining that the yaw of the bulldozer has changed due to the bulldozer being forced off its desired straight line of travel. However, the yaw of the machine does not indicate the desired direction of travel, and therefore the operator is responsible for determining a new desired straight line after steering compensation is made. The responsibility of ensuring that the bulldozer continues to travel the desired straight-line path is left to the operator of the machine.

In the case of a manually operated earthmoving machine, by the time that yaw is detected, the machine may have moved a significant amount from the desired course. Also, even if the yaw were detected in time and the blade were tilted to perform steering corrections, a cross-slope would be generated as a result of tilting the blade and such a cross-slope may deteriorate a quality of the work performed in an associated pass of the machine in addition to the machine encountering the cross-slope when the machine traverses a subsequent pass.

Precise alignment of such earthmoving machines would be even more desirable when a slot-dozing technique is being implemented. Also, when such earthmoving machines are configured to perform one or more earthmoving operations autonomously, it may be helpful to incorporate a re-alignment functionality within a scope of the autonomous features associated with such machines so that while the machine may perform earthmoving operations and return to re-perform the same in a repetitive manner, an amount of time that may be incurred in re-aligning the machine is optimized, or preferably reduced, for quickly positioning the machine to perform productive earthmoving operations in a subsequent pass.

U.S. Pat. No. 6,062,317 discloses a system and method for maintaining the movement of an earthmoving machine in a desired straight-line direction that could assist in the slot-dozing technique. Nevertheless, there is still room for improvements to be made in the control of an earthmoving machine. Therefore, it would be desirable to implement a system that can optimize an amount of distance and hence, an amount of time that is required for alignment of the machine with a slot without the need for operator intervention.

SUMMARY OF THE DISCLOSURE

In an aspect of the present disclosure, a system for controlling operation of a machine having a frame supported by ground engaging members and having a work implement movably supported by the frame is provided. The system includes a machine position sensor that is configured to output data pertaining to a position and orientation of the machine within a worksite. The system further includes an implement position sensor that is configured to output data pertaining to a position and orientation of the work implement within the worksite. The system also includes a controller that is disposed in communication with the machine position sensor and the implement position sensor. The controller is configured to receive the data output by the machine position sensor and the implement position sensor. Further, the controller is configured to compute an amount of gap that is required for alignment of the machine and the work implement with a slot based on the received data. Furthermore, the controller is also configured to control a movement of the ground engaging members for positioning the machine at the computed amount of gap from a cut point located within the slot prior to the work implement entering a cut position for performing a cut within the slot.

In an additional aspect of the present disclosure, the controller is configured to compute the amount of gap based on an amount of deviation between a current position and orientation of each of the machine and the work implement to a position and orientation of respective ones of the machine and the work implement required for alignment with the slot. To that end, the controller may be configured to increase the computed amount of gap if the amount of deviation between the current position and orientation of the machine and the position and orientation of the machine required for alignment with the slot is greater than a first pre-defined threshold. The controller may also be configured to increase the computed amount of gap if the amount of deviation between the current position and orientation of the work implement and the position and orientation of the work implement required for alignment with the slot is greater than a second pre-defined threshold.

In another aspect of the present disclosure, the controller is also configured to determine from the position data whether the work implement is disposed less than a pre-determined distance from a start of a berm associated with the slot. The controller may be configured to increase the computed amount of gap if the controller determines that the work implement is disposed less than the pre-determined distance from the start of the berm.

Further, aspects of the present disclosure have also been directed to an autonomous earthmoving machine employing the system disclosed herein for controlling an operation of the autonomous earthmoving machine. Furthermore, aspects of the present disclosure have also been directed to a method for controlling operation of an autonomous earthmoving machine.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts. With reference to the drawings, the claims, and the specification, the present disclosure is directed to a system 100 and a method 400 for controlling operation of an autonomous earthmoving machine 102 having a work implement 104.

Figure 1:
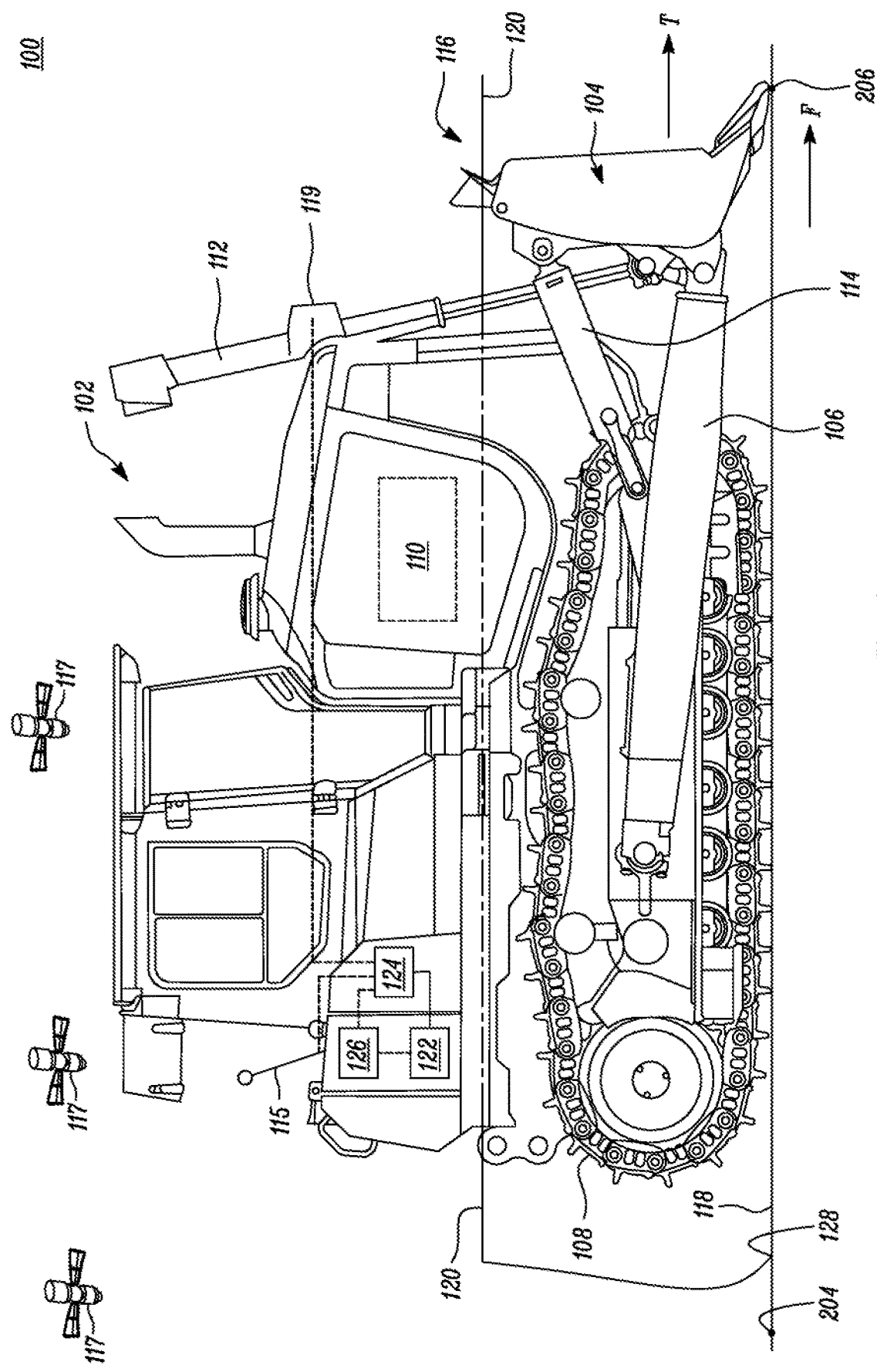
FIG. 1 is a side view of an exemplary machine having a frame supported by ground engaging members and a work implement movably supported by the frame.

Referring to FIG. 1, the machine 102 is shown as a track-type tractor. Although the machine 102 depicted in the illustrated embodiment of FIG. 1 is embodied as a track-type tractor, in other embodiments, the machine 102 may embody any other type of mobile machine that is configured to perform operations associated with industries related to mining, construction, farming, or any other industry known in the art. Also, the machine 102 disclosed herein is embodied as an autonomous machine, however, it may be noted that in alternative embodiments the machine 102 disclosed herein can embody a semi-autonomous earthmoving machine or a manned earthmoving machine i.e., manually operated earthmoving machine.

As shown in FIG. 1, the machine 102 includes a frame 106 and a pair of ground engaging members rotatably supported on the frame 106 of which only one ground engaging member 108 is visible in the side view of the machine 102 depicted in FIG. 1. As shown in the illustrated embodiment of FIG. 1, the ground engaging members 108 are embodied as tracks. These ground engaging members 108 may be driven by drive power output by a prime mover 110. The prime mover 110 may include, but is not limited to, an engine, an electric motor, or any other type of prime mover known to persons skilled in the art for propelling the machine 102 on a ground surface.

Moreover, although the ground engaging members 108 are depicted as tracks in the illustrated embodiment of FIG. 1, it may be noted that the tracks disclosed herein are merely exemplary in nature, and hence, non-limiting of this disclosure. In other embodiments, the ground engaging members 108 could include other types of structures that are known by persons skilled in the art for facilitating a propulsion of the machine 102 on the ground surface. For example, the ground engaging members 108 could include wheels in lieu of tracks disclosed herein.

The work implement 104 associated with the track-type tractor is embodied in the form of an earth digging and carrying blade as shown in the illustrated embodiment of FIG. 1. Track-type tractors having blades are commonly used to dig and push material from a start position to an end position. It may be noted that other types of machines having similar or other types of work implements may be used to realize embodiments of the present disclosure. For example, a wheel loader having a bucket, or a motor grader having a blade may be used for implementing the embodiments disclosed in conjunction with the present disclosure.

Typically, the machine 102 controls the position of the work implement 104 relative to the frame 106 and the material being worked. For example, the machine 102 of FIG. 1 controls the position of the work implement 104 with the use of hydraulic cylinders. FIG. 1 illustrates an implement lift cylinder 112 used to raise and lower the implement 104. Typically, a machine of the type shown in FIG. 1 will have more than one lift cylinder 112, e.g., two lift cylinders located at spaced apart positions toward the left and right ends of the work implement 104.

An implement tilt cylinder 114 is used to tilt the work implement 104. Typically, a machine of the type shown in FIG. 1 will have more than one tilt cylinder 114, e.g., two tilt cylinders located at spaced apart positions toward the left and right ends of the work implement 104. The implement lift cylinders 112 are configured to lift the implement, and the implement tilt cylinders 114 are configured to tilt either the left or right end of the implement, i.e., raise or lower one end of the work implement 104 relative to the other end of the work implement 104. It may be noted that the cylinder configuration shown in FIG. 1 is one possible configuration which may be used with the machine 102 disclosed herein. Other types of implement control arrangements may be used depending on a type of the machine without deviating from the spirit of the present disclosure.

As shown in the illustrated embodiment of FIG. 1, the machine 102 may be located within a worksite 116 and positioned within a slot 118 defined in the worksite 116. Further, as shown in FIG. 1, the slot 118 may be flanked by a pair of berms of which one berm 120 is shown in the view of FIG. 1. In the illustrated embodiment of FIG. 1, the machine 102 is shown in a state of operation prior to initiating a pass, as indicated by direction arrow 'F', within the slot 118 in which the work implement 104 may be operated to cycle through a series of operations including but not limited to, loading, carrying, dumping, and spreading earth materials associated with the worksite 116.

The system 100 for controlling operation of the machine 102 includes a machine position sensor 122 that may be disposed on the frame 106 of the machine 102 as shown in the illustrated embodiment of FIG. 1. The machine position sensor 122 would be configured to sense a position and orientation of the machine 102 within the worksite 116. The machine position sensor 122 disclosed herein may include a single sensor or a plurality of individual sensors (not shown) that cooperate to provide signals to a controller 124 to indicate the position and orientation of the machine 102.

In an exemplary embodiment, the machine position sensor 122 disclosed herein may include two or more types of sensors including, but not limited to, a Global Positioning System (GPS) sensor, a Global Navigation Satellite System (GNSS) sensor, and an Inertial Measurement Unit (IMU) sensor. When a GPS sensor or a GNSS sensor is being used to form part of the machine position sensor 122 disclosed herein, the system 100 may additionally include a locating device 115 that is configured to communicate with one or more satellites 117, which in turn, may communicate to the controller 124 various information pertaining to the position and/or orientation of the machine 102 relative to the worksite 116.

Moreover, when a GPS sensor or a GNSS sensor is used in conjunction with an IMU sensor to form the machine position sensor 122 disclosed herein, the signals from such a combination of sensors may be combined by the controller 124 to obtain a "pose" of the machine 102 that includes both the position and the orientation of the machine 102 relative to the worksite 116. Furthermore, the controller 124 may continually balance errors from the GPS or GNSS sensor and the IMU sensor in order to provide the "pose" with a low error rate.

Although it is disclosed herein that the machine position sensor 122 may include a combination of the GPS or GNSS sensor and the IMU sensor, other types of sensors can be contemplated by persons skilled in the art. In exemplary alternative embodiments of this disclosure, an odometer, a perception based sensor, a wheel rotation sensing sensor, a laser sensing system may be used, in addition to, or in lieu of one or more of the GPS sensor, the GNSS sensor, and the IMU sensor to form the machine position sensor 122 disclosed herein.

Thus, using the signals output by the machine position sensor 122, the controller 124 may determine the position of the machine 102 within the worksite 116 as well as the orientation of the machine 102 such as the heading, pitch and roll that is associated with the machine 102. In doing so, dimensions of the machine 102 may also be stored within the controller 124 in relation to the machine position sensor 122 that defines a datum or reference point on the machine 102 and the controller 124 may use such dimensions to determine the outer boundary of the machine 102.

The system 100 disclosed herein also includes an implement position sensor 119 that is configured to output data pertaining to a position and orientation of the work implement 104 within the worksite 116. In the illustrated embodiment of FIG. 1, the implement position sensors 119 are embodied as cylinder position sensors that may be associated with the lift and tilt cylinders 112, 114. Such cylinder position sensors may, for example, correlate current operating pressures associated with each of the lift and tilt cylinders 112, 114 to obtain the position and orientation of the work implement 104 relative to the frame 106 of the machine 102. Alternatively, these implement position sensors 119 may embody any type or combination of sensors including, but not limited to, a GPS sensor, a GNSS sensor, an IMU sensor, a perception based sensor, or a laser sensing system that may be configured to provide, to the controller 124, the position and orientation of the work implement 104 relative to the worksite 116.

When the machine 102 traverses a pass within the slot 118 in which one or more operations i.e., load, carry, dump, spread disclosed earlier herein may be executed by the machine 102, the machine 102 may drift off from its desired direction of travel 'T' and become misaligned with its desired direction of travel 'T'. This "drift" of the machine 102 may be due, at least in part, to uneven loading forces on the work implement 104, or a loss of traction in one of the ground engaging members 108 amongst a variety of other reasons that are known to persons skilled in the art for causing a machine to become misaligned with its desired direction of travel.

Figure 2:
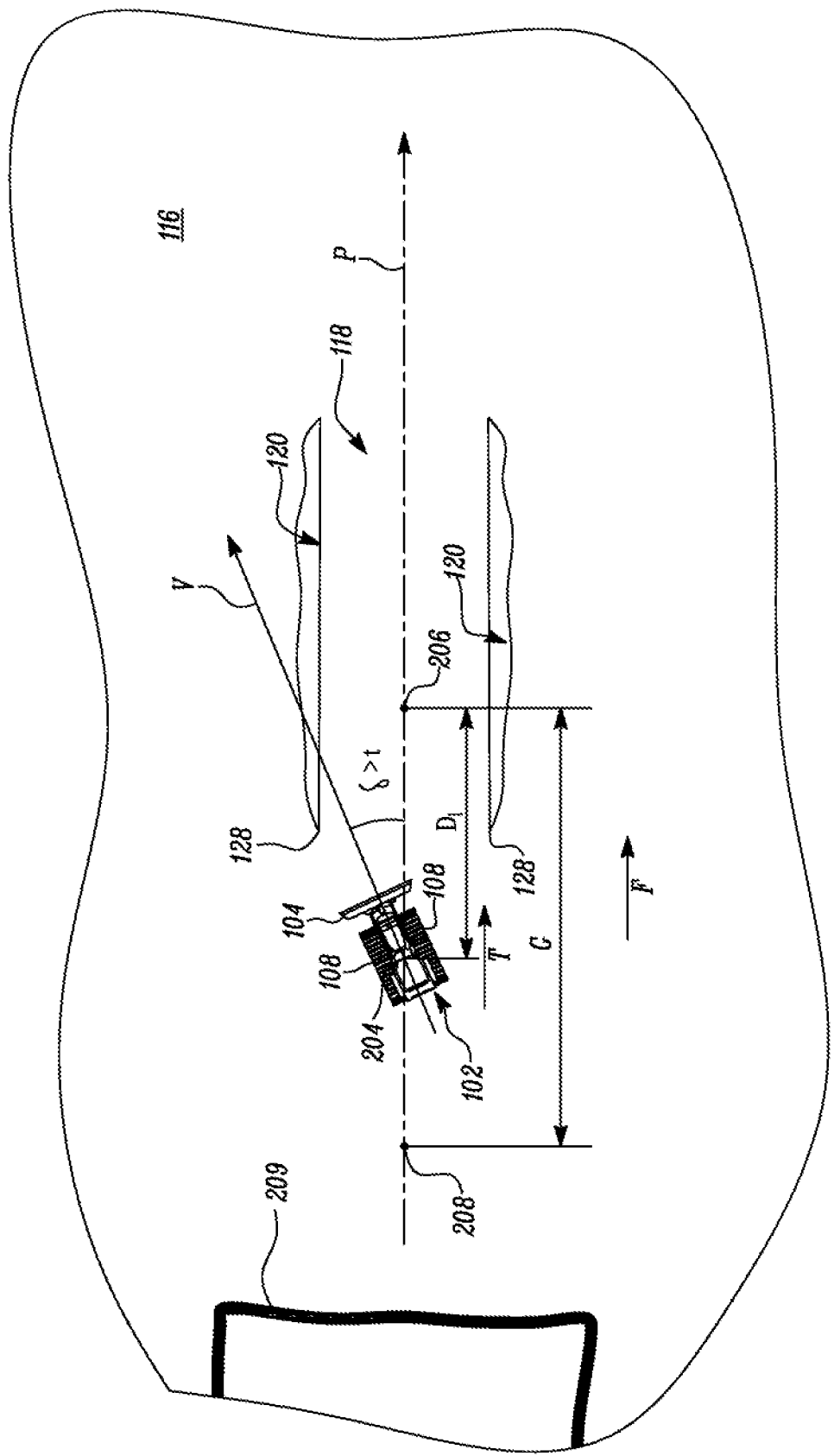
FIG. 2 is a diagrammatic representation of the exemplary machine positioned in a state in which the machine exhibits a deviation between its current direction of heading and a direction of heading that would be desired from the machine to align with a slot, according to an embodiment of the present disclosure.

Consequently, as shown in an example with the help of FIG. 2, when the machine 102 has returned to a start position 204 located prior to a "planned cut point" as indicated by numeral '206', the machine 102 may require re-alignment with the slot 118 to which a desired direction of travel 'T' for the machine 102 coincides with and to which a vector 'V' designating a projected direction of travel for the machine 102 should be aligned with. The terms "planned cut point" is indicative of a point at which the work implement 104 is required to perform a cutting operation and initiate loading of the work implement 104. Therefore, in this disclosure, the terms "a cut position of the work implement" or "the cut position of the work implement" may be regarded as a position of the work implement 104 in which the work implement 104 initiates contact with the ground surface so that the work implement 104 can perform a loading operation.

Moreover, for sake of the present disclosure, it may be noted that the scope of the terms "alignment of the machine" disclosed herein encompasses both—an alignment of the ground engaging members 108 with the slot 118 and an alignment of the work implement 104 with the slot 118. In some cases, it may be possible that an amount of distance '$D_1$' between the start position 204 of the machine 102 and the planned cut point 206 as shown in FIG. 2 may be insufficient to accomplish the alignment of the machine 102 with the slot 118 so that the machine 102 is disposed in its desired direction of travel 'T' i.e., in a direction collinear with a mid-plane 'P' of the slot 118.

Figure 3:
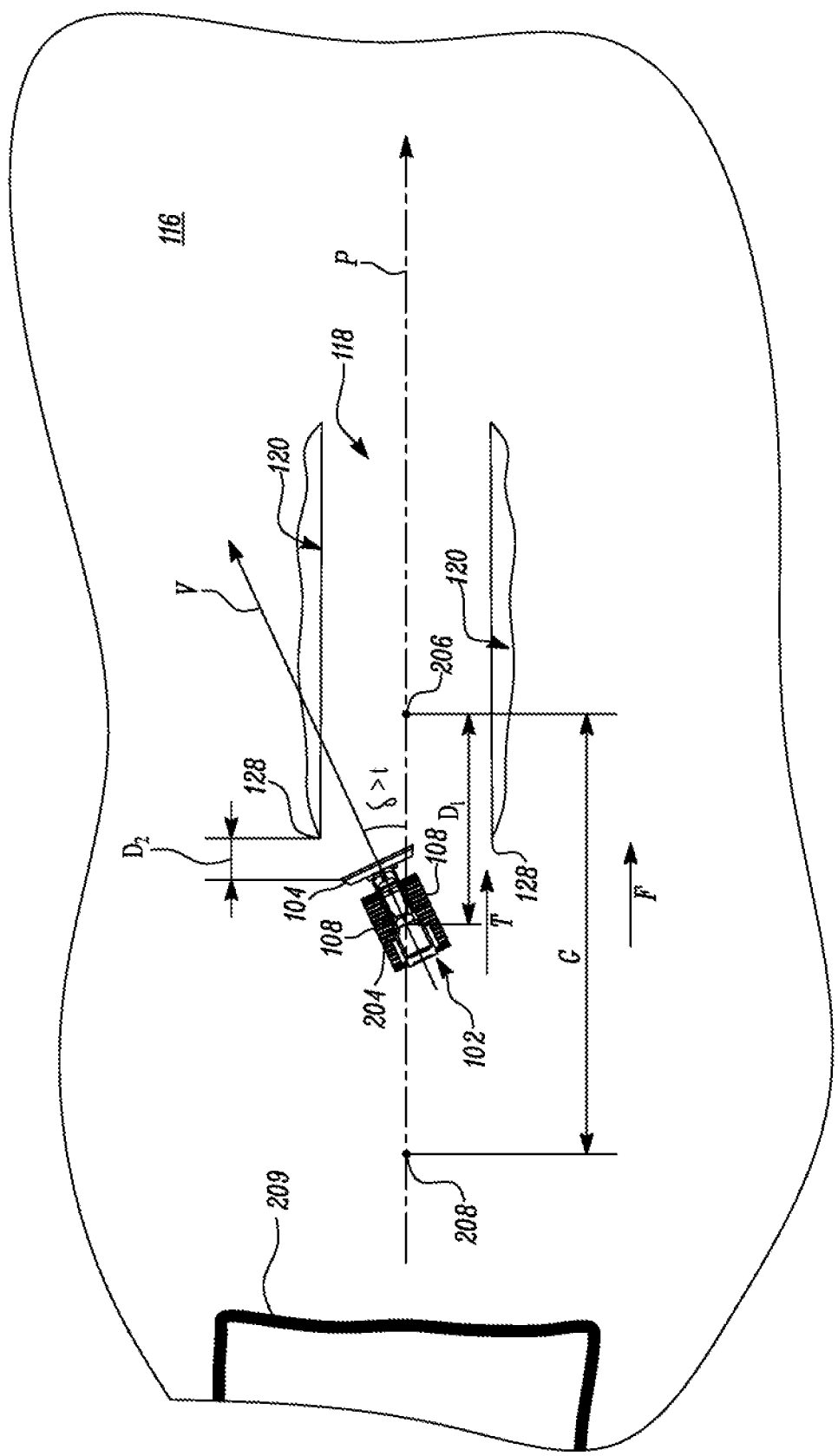
FIG. 3 is another diagrammatic representation of the exemplary machine in which the work implement of the machine is disposed less than a pre-determined distance from a start of a berm located adjacent to the slot, according to yet another embodiment of the present disclosure.

In another example as shown in FIG. 3, upon returning the machine 102 to a start point 204, the machine 102 may be located such that the work implement 104 is disposed less than a pre-determined distance '$D_2$' from a start 128 of the berm 120. The pre-determined distance '$D_2$' disclosed herein may be regarded as the minimum amount of distance that would be required to align the machine 102 with the slot 118 without the work implement 104 coming into contact with the start 128 of the berm 120.

The controller 124 disclosed herein is configured to optimize an amount of gap 'G' that would be required for alignment of the machine 102 with the slot 118 prior to the work implement 104 entering a cut position i.e., engaging with the ground surface at the planned cut point 206 shown in FIG. 2 for performing a cut within the slot 118. As disclosed in FIG. 2, the amount of distance '$D_1$' between the start position 204 of the machine 102 and the planned cut point 206 may be insufficient to perform an alignment of the machine 102 with the slot 118 prior to the work implement 104 entering the cut position at the planned cut point 206, or as disclosed in FIG. 3, the start position 204 of the machine 102 may be such that the work implement 104 associated with the machine 102 is disposed less than the pre-determined distance '$D_2$' from the start 128 of the berm 120.

The controller 124 disclosed herein is configured to optimize the amount of gap 'G' required for alignment of each of the ground engaging members 108 and the work implement 104 with the slot 118 by computing an amount of distance that would be required between the cut position 206 located within the slot 118 and the start position 204 of the machine 102. This optimization of the amount of gap 'G' is performed by the controller 124 so that sufficient distance can be provided to the machine 102 in its return pass for facilitating an alignment of the machine 102 with the slot 118 prior to the work implement 104 entering the cut position 206, and such that the work implement 104 of the machine 102 does not come into contact with the berm 120.

The optimized amount of gap disclosed herein is denoted by identical alphabets 'G' in FIGS. 2 and 3 respectively. In the example of FIG. 2, upon receiving position data from the position sensor 122, if the controller 124 determines that an amount of deviation 'δ' between the current positions of each of the ground engaging members 108 and the work implement 104 to the positions of respective ones of the ground engaging members 108 and the work implement 104 required for alignment with the slot 118 is greater than a first pre-defined threshold 't' e.g., 5 degrees, then the controller 124 may increase the amount of the distance '$D_1$' between the start position 204 and the planned cut point 206 thus rendering an optimized amount of gap 'G' that is configured to extend between a fresh start position 208 as opposed to the start position 204 disclosed earlier herein.

Moreover, it may be noted that an increase in the amount of distance '$D_1$' between the start position 204 of the machine 102 and the planned cut point 206 to render the optimized amount of the gap 'G' by the controller 124 may be dependent on a magnitude of the deviation between a desired heading of the machine 102 and an actual heading of the machine 102, as described earlier herein with the help of the terms "the desired direction of travel 'T'" and the vector 'V' representing "the projected direction of travel" respectively, when the machine 102 would be disposed in misalignment with its desired direction of travel 'T'. This increase in the amount of distance '$D_1$' to render the optimized amount of gap 'G' may be accomplished with the use of a closed feedback loop incorporating a control module as indicated by numeral 126 in the FIGS. 1-3. The control module 126 may be e.g., a proportional gain controller, a proportional-integral (PI) controller, or a proportional-integral-derivative (PID) controller, but is not limited thereto.

Although in the example of FIG. 2, the machine 102 is shown to exhibit deviation δ only by way of an angular misalignment with the mid-plane 'P' of the slot 118, a scope of the term "deviation" is not limited thereto. Rather, it should be noted that the term "deviation" disclosed herein may also extend to include other types of misalignments, for example, any lateral offset between a current position of the machine 102 with the mid-plane 'P' of the slot 118. It will be acknowledged by persons skilled in the art that any number and/or type of misalignments may be possible between the current position and orientation of a machine and its desired heading. However, describing every possible type and number of misalignments would be impractical, if not impossible. As FIG. 2 does not depict all the possible types and number of misalignments, the diagrammatic illustration of FIG. 2 should not be construed as being limiting of this disclosure.

Turning to the example of FIG. 3, if the controller 124 determines that the start point of the machine 102 is located such that the work implement 104 associated with the machine 102 is disposed less than the pre-determined distance '$D_2$', then the controller 124 could increase the amount of distance '$D_1$' between the start position 204 of the machine 102 and the planned cut point 206 to render the optimized amount of the gap 'G' for the machine 102. As shown in FIG. 3, the optimized amount of the gap 'G' extends between the fresh start position 208 and the planned cut point so that the machine 102 can have an adequate amount of distance to align itself with the slot 118 while ensuring that the work implement 104 is prevented from coming into contact with the berm 120.

Upon computing the optimized amount of gap 'G', the controller 124 could generate one or more command signals to actuate movement of the ground engaging members 108 associated with the machine 102, for example, via a drivetrain (not shown) of the machine 102, and to actuate movement of the hydraulic cylinders 112, 114 present on the machine 102 for positioning the machine 102 and the work implement 104 respectively into alignment with the slot 118 prior to the work implement 104 entering the cut position or coming into contact with the berm 120.

It is to be noted that in embodiments of this disclosure, the optimized amount of gap 'G' may be computed by the controller 124 whilst taking into account the position and/or orientation of a high wall 209 that could be located within the worksite 116 as shown exemplarily in the views of FIGS. 2 and 3. In embodiments herein, the controller 124 may compute the optimized amount of gap 'G' such that the start position 208 of the machine 102 is located away from the high wall 209.

The controller 124 disclosed herein could include various software and/or hardware components that are configured to perform functions consistent with the present disclosure. As such, the controller 124 of the present disclosure may be a stand-alone control system or may be configured to cooperate with an existing electronic control module (ECU) (not shown) of the machine 102. Further, the controller 124 may embody a single microprocessor or multiple microprocessors that include components for selectively and independently actuating specific system hardware associated with the machine 102.

Numerous commercially available microprocessors can be configured to perform the functions of the controller 124 disclosed herein. It should be appreciated that the controller 124 could readily be embodied in a general machine microprocessor capable of controlling numerous machine functions. The controller 124 may include a memory, a secondary storage device, a processor, and any other components for running an application. Various other circuits may be associated with the controller such as power supply circuitry, signal conditioning circuitry, solenoid driver circuitry, and other types of circuitry. Various routines, algorithms, and/or programs can be programmed within the controller 124 for execution thereof to actuate specific system hardware associated with the machine 102.

Moreover, although the system 100 is described herein as being physically associated with the machine 102, it should be noted that in alternative embodiments of the present disclosure, the system 100 may be implemented in any number of different arrangements. For example, the controller may be at least partially implemented at a command center (not shown) situated locally or remotely relative to the worksite 116 with sufficient means for communicating with the machine 102, for example, via the satellites 117, or the like.

Figure 4:
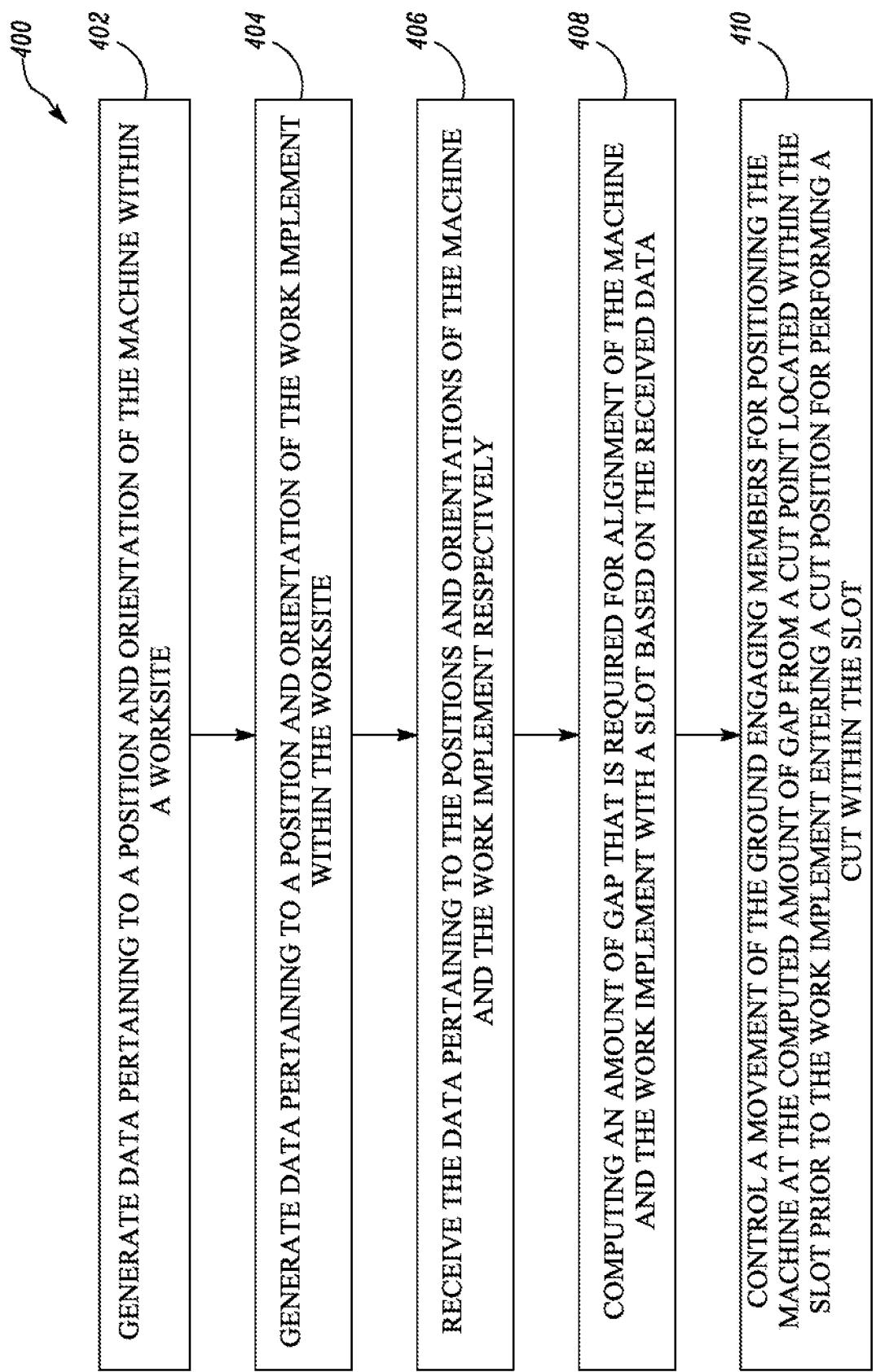
FIG. 4 is a flowchart of a method depicting steps for controlling operation of the machine, according to an embodiment of the present disclosure.

FIG. 4 illustrates a flowchart depicting a method 400 for controlling operation of the exemplary machine 102. As shown at step 402 of FIG. 4, the method 400 includes generating, by means of the machine position sensor 122, position data pertaining to a position and orientation of the machine 102 within the worksite 116. At step 404, the method 400 also includes generating, by means of the implement position sensor 119, data pertaining to a position and orientation of the work implement 104 within the worksite 116. At step 406, the method 400 then includes receiving, by means of the controller 124, the data output by the machine position sensor 122 and the implement position sensor 119.

The method 400 then proceeds from step 406 to 408 in which the controller 124 computes the amount of gap 'G' required for alignment of the machine 102 and the work implement 104 with the slot 118 based on the received data. The method 400 then proceeds from step 406 to 408 in which the method 400 includes controlling, by means of the controller 124, a movement of the ground engaging members 108 for positioning the machine 102 at the computed amount of gap "G" from the cut point 206 located within the slot 118 prior to the work implement 104 entering a cut position for performing a cut within the slot i.e., prior to the work implement 104 engaging with the work surface at the cut point 206 to perform the cut.

In an embodiment, the method 400 includes computing the amount of the gap 'G', by the controller 124, based on an amount of deviation δ between a current position and orientation of each of the machine 102 and the work implement 104 to a position and orientation of respective ones of the machine 102 and the work implement 104 required for alignment with the slot 118. In one embodiment, the method 400 includes increasing, by means of the controller 124, the computed amount of the gap 'G' if the amount of deviation δ between the current position and orientation of the machine 102 and the position and orientation of the machine 102 that is required for alignment with the slot 118 is greater than the first pre-defined threshold. Additionally, or alternatively, the method 400 also includes increasing, by means of the controller 124, the computed amount of the gap 'G' if the amount of deviation δ between the current position and orientation of the work implement 104 and the position and orientation of the work implement 104 that is required for alignment with the slot 118 is greater than the second pre-defined threshold.

Although in the foregoing embodiments, an increase in the computed amount of the gap 'G' has been discussed, it may be noted that in alternative embodiments, if the controller 124 determines that the amount of deviation δ between the current position and orientation of the machine 102 and the position and orientation of the machine 102 required for alignment with the slot 118 is less than the first predefined threshold, or that the amount of deviation δ between the current position and orientation of the work implement 104 and the position and orientation of the work implement that would be required for alignment with the slot 118 is less than the second pre-defined threshold, then the controller may be configured to decrease the computed amount of the gap 'G'. This decreased amount of the gap 'G' may help reduce cycle times in each pass of the machine 102.

Additionally, or alternatively, the method 400 disclosed herein also includes determining from the position data whether the work implement 104 is disposed less than the pre-determined distance '$D_2$' from the start 128 of the berm 120. If the controller 124 determines that the work implement 104 is disposed less than the pre-determined distance '$D_2$' from the start 128 of the berm 120, the method 400 includes increasing, by means of the controller 124, the computed amount of the gap 'G'.

INDUSTRIAL APPLICABILITY

Embodiments of the present disclosure have applicability for use in optimizing an amount of gap that would be required by an earthmoving machine for aligning itself prior to a work implement of the machine entering a cut position. Embodiments of the present disclosure, when implemented in a machine, can also improve cycle times associated with operation of the machine thereby leading to an improved productivity of the machine and lowering costs that were previously incurred with operation of the machine.

As disclosed herein, when the controller 124 determines that the amount of distance '$D_1$' between the start position 204 and the cut position is inadequate for alignment of the machine 102 with the slot 118, the controller 124 increases the amount of distance '$D_1$' between the start and cut positions to render an optimized amount of gap 'G' for the machine 102 to align itself with the slot 118. Also, if the controller 124 determines that the work implement 104 is disposed less than the pre-determined distance '$D_2$' from the start of the berm 120, the controller 124 increases the amount of distance '$D_1$' between the start and cut positions to render the optimized amount of gap 'G' for the machine 102 to align itself with the slot 118. The present disclosure therefore helps to obviate operator intervention and hence, reduce operator fatigue that was usually entailed in determining an amount of distance that an earthmoving machine should "back up" from a planned cut point in order to re-align the machine prior to engaging the work implement with the ground surface at the planned cut point for performing an earthmoving operation.

While aspects of the present disclosure have been particularly shown and described with reference to the embodiments above, it will be understood by those skilled in the art that various additional embodiments may be contemplated by the modification of the disclosed vehicles, systems and methods without departing from the spirit and scope of what is disclosed. Such embodiments should be understood to fall within the scope of the present disclosure as determined based upon the claims and any equivalents thereof.

What is claimed is:

1. A system for controlling operation of an autonomous earthmoving machine having a frame supported by ground engaging members and having a work implement movably supported by the frame, the system comprising:
    a machine position sensor configured to output data pertaining to a position and orientation of the machine within a worksite;
    an implement position sensor configured to output data pertaining to a position and orientation of the work implement within the worksite; and
    a controller disposed in communication with the machine position sensor and the implement position sensor, the controller configured to:
        receive the data output by the machine position sensor and the implement position sensor;
        compute an amount of gap required so sufficient distance is provided to the machine in a return pass thereof for realignment of the machine and the work implement with a slot based on the received data and the machine having returned or returning from a previous cut within the slot; and
        control a movement of the ground engaging members for positioning the machine at the computed amount of gap from a cut point located within the slot prior to the work implement entering a cut position for performing a cut within the slot.

2. The system of claim 1, wherein the controller is configured to compute the amount of the gap based on an amount of deviation between a current position and orientation of each of the machine and the work implement to a position and orientation of respective ones of the machine and the work implement required for alignment with the slot.

3. The system of claim 2, wherein the controller is configured to increase the computed amount of the gap when the amount of deviation between the current position and orientation of the machine and the position and orientation of the machine required for alignment with the slot is greater than a first pre-defined threshold.

4. The system of claim 2, wherein the controller is configured to increase the computed amount of the gap when the amount of deviation between the current position and orientation of the work implement and the position and orientation of the work implement required for alignment with the slot is greater than a second pre-defined threshold.

5. The system of claim 1, wherein the controller is configured to determine from the data pertaining to the position of the work implement whether the work implement is disposed less than a pre-determined distance from a start of a berm associated with the slot.

6. The system of claim 5, wherein the controller is configured to increase the computed amount of the gap responsive to the controller determining that the work implement is disposed less than the pre-determined distance from the start of the berm.

7. An autonomous earthmoving machine comprising:
a frame supported by a pair of ground engaging members;
a work implement movably supported by the frame;
a machine position sensor configured to output data pertaining to a position and orientation of the machine within a worksite;
an implement position sensor configured to output data pertaining to a position and orientation of the work implement within the worksite; and
a controller disposed in communication with the machine position sensor and the implement position sensor, the controller configured to:
receive the data output by the machine position sensor and the implement position sensor;
compute an amount of gap required so sufficient distance is provided to the machine in a return pass thereof for realignment of the machine and the work implement with a slot based on the received data and the machine having returned or returning from a previous cut within the slot; and
control a movement of the ground engaging members for positioning the machine at the computed amount of gap from a cut point located within the slot prior to the work implement entering a cut position for performing a cut within the slot.

8. The autonomous earthmoving machine of claim 7, wherein the controller is configured to compute the amount of the gap based on an amount of deviation between a current position and orientation of each of the machine and the work implement to a position and orientation of respective ones of the machine and the work implement required for alignment with the slot.

9. The autonomous earthmoving machine of claim 8, wherein the controller is configured to increase the computed amount of the gap when the amount of deviation between the current position and orientation of the machine and the position and orientation of the machine required for alignment with the slot is greater than a first pre-defined threshold.

10. The autonomous earthmoving machine of claim 8, wherein the controller is configured to increase the computed amount of the gap when the amount of deviation between the current position and orientation of the work implement and the position and orientation of the work implement required for alignment with the slot is greater than a second pre-defined threshold.

11. The autonomous earthmoving machine of claim 8, wherein the controller is configured to increase the computed amount of the gap responsive to the controller determining that the work implement is disposed less than the pre-determined distance from the start of the berm.

12. The autonomous earthmoving machine of claim 7, wherein the controller is configured to determine from the data pertaining to the position of the work implement whether the work implement is disposed less than a pre-determined distance from a start of a berm associated with the slot.

13. A method for controlling operation of an autonomous earthmoving machine having a frame supported by ground engaging members and having a work implement movably supported by the frame, the method comprising:
generating, by means of a machine position sensor, data pertaining to a position and orientation of the machine within a worksite;
generating, by means of an implement position sensor, data pertaining to a position and orientation of the work implement within the worksite;
receiving, by means of a controller, the data output by the machine position sensor and the implement position sensor;
computing, by means of the controller, an amount of gap required so sufficient distance is provided to the machine in a return pass thereof for realignment of the machine and the work implement with a slot based on the received data; and
controlling, by means of the controller, a movement of the ground engaging members for positioning the machine at the computed amount of gap from a cut point located within the slot prior to the work implement entering a cut position for performing a cut within the slot.

14. The method of claim 13 further comprising computing the amount of the gap, by the controller, based on an amount of deviation between a current position and orientation of each of the machine and the work implement to a position and orientation of respective ones of the machine and the work implement required for alignment with the slot.

15. The method of claim 14 further comprising increasing, by means of the controller, the computed amount of the gap when the amount of deviation between the current position and orientation of the machine and the position and orientation of the machine required for alignment with the slot is greater than a first pre-defined threshold.

16. The method of claim 14 further comprising increasing, by means of the controller, the computed amount of the gap when the amount of deviation between the current position and orientation of the work implement and the position and orientation of the work implement required for alignment with the slot is greater than a second pre-defined threshold.

17. The method of claim 14 further comprising decreasing, by means of the controller, the computed amount of the gap when the amount of deviation between the current position and orientation of the machine and the position and orientation of the machine required for alignment with the slot is less than a first pre-defined threshold.

18. The method of claim 14 further comprising decreasing, by means of the controller, the computed amount of the gap when the amount of deviation between the current position and orientation of the work implement and the position and orientation of the work implement required for alignment with the slot is less than a second pre-defined threshold.

19. The method of claim 13 further comprising determining from the data pertaining to the position of the work implement, by means of the controller, whether the work implement is disposed less than a pre-determined distance from a start of a berm associated with the slot.

20. The method of claim 19 further comprising, increasing, by means of the controller, the computed amount of the gap responsive to the controller determining that the work implement is disposed less than the pre-determined distance from the start of the berm.

* * * * *